(12) United States Patent
Wei et al.

(10) Patent No.: US 11,350,068 B2
(45) Date of Patent: May 31, 2022

(54) VIDEO TONE MAPPING USING A SEQUENCE OF STILL IMAGES

(71) Applicant: Google LLC, Mountain View, CA (US)

(72) Inventors: Li Wei, Kingwood, TX (US); Wei Hong, Sunnyvale, CA (US); Marius Renn, Mountain View, CA (US)

(73) Assignee: Google LLC, Mountain View, CA (US)

( * ) Notice: Subject to any disclaimer, the term of this patent is extended or adjusted under 35 U.S.C. 154(b) by 75 days.

(21) Appl. No.: 16/751,853

(22) Filed: Jan. 24, 2020

(65) Prior Publication Data

US 2021/0084271 A1  Mar. 18, 2021

Related U.S. Application Data

(63) Continuation-in-part of application No. 16/570,613, filed on Sep. 13, 2019, now Pat. No. 11,223,809.

(51) Int. Cl.
*H04N 9/64* (2006.01)
*H04N 5/232* (2006.01)

(52) U.S. Cl.
CPC ......... *H04N 9/646* (2013.01); *H04N 5/23229* (2013.01)

(58) Field of Classification Search
None
See application file for complete search history.

(56) References Cited

U.S. PATENT DOCUMENTS

| | | |
|---|---|---|
| 2016/0093029 A1 | 3/2016 | Micovic et al. |
| 2018/0025477 A1 | 1/2018 | Min et al. |
| 2020/0169742 A1* | 5/2020 | Su .................... H04N 19/30 |

FOREIGN PATENT DOCUMENTS

CN  105279485 B  12/2018

OTHER PUBLICATIONS

Extended European Search Report for European Application No. 20195819.6, dated Dec. 18, 2020, 9 pages.

* cited by examiner

*Primary Examiner* — Quan Pham
(74) *Attorney, Agent, or Firm* — Brake Hughes Bellermann LLP

(57) ABSTRACT

Techniques described herein include receiving a first video frame including a first color map, receiving at least one second video frame, receiving a third video frame including a second color map, generating at least one color map based on the first color map and the second color map, associating the at least one third color map with the at least one second frame, the associated at least one second frame being sequentially positioned between the first frame and the second frame, tone correcting the associated at least one second frame based on the at least one generated third color map and color correcting the at least one second frame based on the at least one generated third color map.

20 Claims, 11 Drawing Sheets

VIDEO TONE MAPPING USING A SEQUENCE OF STILL IMAGES

CROSS-REFERENCE TO RELATED APPLICATION

This application claims priority to, and is a continuation-in-part of, U.S. patent application Ser. No. 16/570,613, filed on Sep. 13, 2019, entitled "VIDEO COLOR MAPPING USING STILL IMAGE," the disclosure of which is incorporated by reference herein in its entirety.

BACKGROUND

An image can correspond to one of a plurality of sequential (e.g., in time) images sometimes called a photo file strip and/or associated with a frame of a short video sometimes called a motion-photo and/or micro-video. The image can have a color/lighting difference when compared to a corresponding image of the plurality of sequential images (e.g., photo file strip) or frame of the short video (e.g., micro-video). This color/lighting difference can be noticeable when a viewer switches (e.g., when viewing on mobile device) between the image and the plurality of sequential images (e.g., photo file strip) or the short video (e.g., micro-video) leading to a less than desirable user experience.

SUMMARY

Implementations improve the visual quality of frames of a video using at least one quality corrected image captured at substantially the same moment in time as one or more of the frames of the video. To improve the visual quality of the frames of the video at least one quality parameter difference between the at least one corrected image and a corresponding frame of the video can be determined. Then, the visual quality of the frames of the video can be improved using the at least one quality parameter difference.

A general aspect, includes receiving a plurality of frames associated with a video file, receiving a first image corresponding to a first frame of the plurality of frames, receiving a second image corresponding to a second frame of the plurality of frames, generating a first color map based on the first image and the first frame, wherein the first color map is based on a color and a tone of the first image and a color and tone of the first frame, generating a second color map based on the second image and the second frame, wherein the second color map is based on a color and a tone of the second image and a color and tone of the second frame, generating a plurality of third color maps based on the first color map and the second color map, associating each of the plurality of third color maps with a different one of the plurality of frames, the associated plurality of frames being sequentially positioned between the first frame and the second frame, tone correcting the associated plurality of frames based on the plurality of generated third color maps, and color correcting the associated plurality of frames based on the plurality of generated third color maps.

Implementations can include one or more of the following features, alone or in any combination with each other. For example, a post-capture process can be performed on the captured first image. A post-capture process can be performed on the second image. The post-capture process includes at least one of noise reduction, stabilization, exposure balancing, white balancing, color noise reduction, color correction, tone scaling, and gamma correction. The first color map can include at least one first correctable quality parameter difference between the first image and the corresponding frame. The second color map includes at least one second correctable quality parameter difference between the second image and the corresponding frame.

For example, tone correcting the associated plurality of frames can include matching at least one of a pixel, a block of pixels, a range of pixels, or a partition of the one or more selected frames to at least one of a pixel, a block of pixels, a range of pixels, or a partition of the color map and using a value of the color map to perform the tone correcting of the one or more selected frames. Color correcting the associated plurality of frames can include matching at least one of the pixel, the block of pixels, the range of pixels, or the partition of the one or more selected frames to at least one of the pixel, the block of pixels, the range of pixels, or the partition of the color map and using the value of the color map to perform the color correcting of the one or more selected frames.

The color map can be partitioned into an M×N grid having M columns and N rows, each partition can include data indicating a correction parameter, and the correction parameter can include a value for gamma correction. Generating the plurality of third color maps can include performing a linear interpolation of at least one parameter value based on a corresponding parameter value of the first color map and the second color map. The first color map can be generated using an overlapping tone mapping grid and the second color map can be generated using the overlapping tone mapping grid.

For example, the method can further include partitioning the first image and partitioning the corresponding frame into a partitioned frame. Generating the first color map can include determining a color variance between each partition of the first image and a corresponding partition of the partitioned frame and determining a tone variance between each partition of the first image and a corresponding partition of the partitioned frame. At least one of the determined color variance and the determined tone variance is based on a luminance difference or a chrominance difference.

Another general aspect includes receiving a plurality of frames associated with a video, receiving a first image corresponding to a first frame of the plurality of frames, receiving a second image corresponding to a second frame of the plurality of frames, generating a first color map based on a color and a tone of the image and a color and tone of the frame to which the first image corresponds, generating a second color map based on a color and a tone of the image and a color and tone of the frame to which the second image corresponds, generating a first data structure including data representing the first color map, generating a second data structure including data representing the first color map, storing the first data structure as metadata in a first header associated with the video, storing the second data structure as metadata in a second header associated with the video, storing at least one frame of the plurality of frames, the at least one frame being sequentially positioned between the first frame and the second frame, and batch encoding the first frame, the second frame, the at least one frame, the first data structure and the second data structure.

Implementation can include one or more of the following features, alone or in any combination with each other. For example, the method can further include performing a post-capture process on the first image. The method can further include performing a post-capture process on the second image. The post-capture process includes at least one of noise reduction, stabilization, exposure balancing, white balancing, color noise reduction, color correction, tone scaling, and gamma correction. The first color map can include at least one first correctable quality parameter difference between the first image and the corresponding frame.

The second color map can include at least one second correctable quality parameter difference between the second image and the corresponding frame. The generated at least one third color map can be partitioned into an M×N grid having M columns and N rows, each partition can include data indicating a correction parameter, and the correction parameter can include a value for gamma correction. The first color map can be generated using an overlapping tone mapping grid. The second color map can be generated using the overlapping tone mapping grid.

Another general aspect includes receiving a first video file including a first frame of a plurality of frames, the first video file including a first header including a first data structure including data representing a first color map, receiving at least one second video file representing at least one second frame of the plurality of frames, receiving a third video file representing a third frame of the plurality of frames, the third video file including a second header including a second data structure including data representing a second color map, generating at least one third color map based on the first color map and the second color map, associating the at least one third color map with the at least one second frame, the associated at least one second frame being sequentially positioned between the first frame and the second frame, tone correcting the associated at least one second frame based on the at least one generated third color map, and color correcting the at least one second frame based on the at least one generated third color map.

Implementation can include one or more of the following features, alone or in any combination with each other. For example, the tone correcting of the at least one second frame can include matching at least one of a pixel, a block of pixels, a range of pixels, or a partition of the at least one second frame to at least one of a pixel, a block of pixels, a range of pixels, or a partition of the corresponding at least one third color map and using a value of the corresponding at least one third color map to perform the tone correcting of the at least one second frame. The color correcting of the at least one second frame can include matching at least one of the pixel, the block of pixels, the range of pixels, or the partition of the at least one second frame to at least one of the pixel, the block of pixels, the range of pixels, or the partition of the corresponding at least one third color map and using the value of the corresponding at least one third color map to perform the color correcting of the at least one second frame.

The generated at least one third color map can be partitioned into an M×N grid having M columns and N rows, each partition can include data indicating a correction parameter, and the correction parameter can include a value for gamma correction. Color correcting of the at least one second frame can include performing a smoothing process to minimize color discontinuities. Color correcting of the at least one second frame can include performing a blending process to minimize color discontinuities. Color correcting of the at least one second frame can include using a trained convolutional neural network to minimize color variance between a partition of the at least one second frame and a partition of the corresponding at least one third color map. Color correcting of the at least one second frame can include performing a chrominance correction process using a mean value of a color space variable and a variance value of the color space variable.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1A:
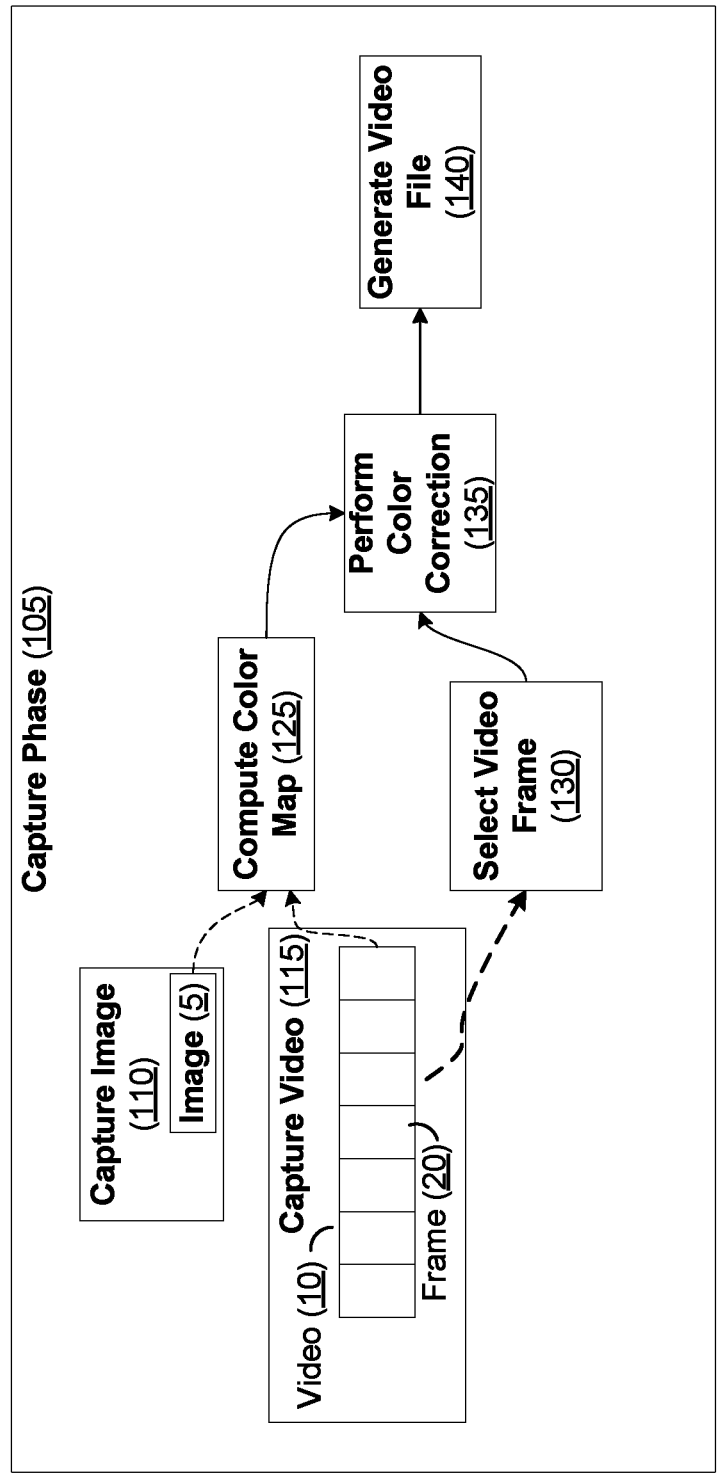
FIG. 1A illustrates a block diagram of a process of generating a video file according to an example implementation.

It should be noted that these Figures are intended to illustrate the general characteristics of methods, structure and/or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementations. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Typically, cameras perform at least one type of post-capture processing on an image to improve the visual quality of the image. The post-capture processing that can improve the visual quality can include noise reduction, stabilization, exposure balancing white balancing, color noise reduction, color correction, tone scaling, gamma correction and/or the like. However, not all of these image post-capture processing operations can be performed during video capture because of the processing time restrictions during video capture. In other words, to capture video at a given frame rate, time consuming post-capture processing that can improve visual quality may not be performed.

Accordingly, at least one technical problem addressed by this disclosure is the disparity in visual quality between an image and a corresponding frame of a video resulting from post-capture processing operations that are performed on the image that are not performed on the frame of the video. The disparity in visual quality can result in a less than desirable user experience when a user of a device displays both the image, the corresponding frame of the video and/or other frames of the video on a display of the device at the same time. The disparity in visual quality can result in a less than desirable user experience when the user of the device cycles between displaying the image and the corresponding frame of the video and/or other frames of the video on the display of the device.

The technical solution to the aforementioned technical problem that is disclosed by this disclosure includes generating a color map defining at least one correctable quality parameter difference between the image and the corresponding frame of the video, and correcting at least one frame of the video using the color map. The corrected at least one frame of the video can be stored in memory for future display and/or the corrected at least one frame of the video can be displayed in response to completing the correction.

The technical effect of the aforementioned technical solution is improved visual quality for each frame (or image) associated with the video. The technical improvement can be derived from using the color map to improve visual quality. This is an improvement over a technique that attempts to use post-capture processing on each frame of the video because the disclosed technical improvement reduces processing demand on the capture device (e.g., a device of limited processing capability) and/or as an operation during capture on the capture device because the image improvement operation can be performed independent of the capture process.

FIG. 1A illustrates a block diagram of a process of generating a video file according to an example implementation. As shown in FIG. 1A, a capture phase 105 includes capturing an image 110 including an image 5, capturing a video 115 including a video 10 having a plurality of frames 20, computing a color map 125, selecting a video frame 130, performing a color correction 135, and generating a video file 140. The capture phase 105 can be implemented by a device including a camera (e.g., a digital camera, a digital video device, a mobile phone and the like). The image 5 and the video 10 can be captured by the camera. One of the plurality of frames 20 and the image 5 can be captured at substantially (e.g., by a same shutter event) same moment in time.

Typically, images captured with camera movement in environments with uneven lighting or low amounts of light can result in blurry images or include random variations in color, brightness and/or tone from pixel to pixel. Accordingly, in an example implementation, post-capture processing is performed on the image 5. The post-capture processing can be configured to improve the visual quality (e.g., improve color, improve tone, and the like), reduce image noise (e.g., improve color variance, improve tone variance, stabilize for movement, etc.), and the like. The post-capture processing can use optical image stabilization (OIS), artificial intelligence, High Dynamic Range (HDR) techniques, HDR+ techniques, sampling, exposure, multi-image averaging and the like to improve the quality of the image 5.

For example, a HDR+ technique can take a burst of image shots with short exposure times, align the images algorithmically, and replace each pixel in a resultant image (e.g., the image to be stored) with the average color at that position across all the image shots. However, similar post-capture processing may not be performed on the video 10. Accordingly, the corresponding one of the plurality of frames 20 and the image 5 can have a different visual quality. Furthermore, the image 5 can have a relatively higher visual quality than the corresponding one of the plurality of frames 20. As a result, the image 5 can have a relatively higher visual quality than the video 10.

In an example implementation, a color map 125 is generated (e.g., via computer processing). The color map 125 can be generated based on the corresponding one of the plurality of frames 20 and the image 5. The color map can include the color and tone variance between the corresponding one of the plurality of frames 20 and the image 5. For example, the corresponding one of the plurality of frames 120 can be stored using the YUV color space and the image 5 can be stored using the YUV color space. Accordingly, the color map can include the difference between a Y (luminance) and UV (chrominance) of the corresponding one of the plurality of frames 120 and the image 5. The color map can include a pixel-by-pixel variance, a value associated with a block of pixels, a value associated with a partition of the corresponding one of the plurality of frames 20 and/or the image 5 and the like. The plurality of frames 20 and/or the image 5 can be stored using a color space other than the YUV color space. For example, the plurality of frames 20 and/or the image 5 can be stored using the RGB, Y'UV, YCbCr, YPbPr, and the like color spaces.

In an example implementation, the color map 125 can be generated using an overlapping tone mapping grid to improve (e.g., enforce) spatio consistency. Spatio (or spatial) consistency can be based on visual appearance across boundaries (e.g., encoding/decoding blocks, grid boundaries and the like). A more consistent visual appearance transition of color, texture and tone across the boundaries can be preferred for user (e.g., viewer) experience. Accordingly, spatio consistency can include having smooth pixel color transitions near (or across) mapping grid boundaries to prevent sharp tone changes. An overlapping tone mapping grid technique includes calculating the correction parameter(s) using grids that overlap column blocks and/or row blocks by a predefined percentage for example tone mapping block 1,1 can overlap tone mapping block 0,1 by 50%. Therefore, correction parameters that are calculated for tone mapping block 0,1 can be based on 50% of the pixels used to determine the pixel-by-pixel variance in tone mapping block 1,1 and correction parameters that are calculated for tone mapping block 1,1 can be based on 50% of the pixels used to determine the pixel-by-pixel variance in tone mapping block 0,1. This technique can be extended to calculating correction parameters for tone mapping block 0,0 to tone mapping block N,N.

In an example implementation, the correction parameter(s) can include control points associated with a tone curve. For example, pixel-by-pixel variance data can include sampling the colors (e.g., RGB variance) in a tone mapping block to generate S samples. C control points are estimated based on the S samples (e.g., to fit the sample data) where C<<S. Estimating the control points can include fitting a curve (e.g., representing a rough tone curve) connecting lines through the control points. A smoothing function can be used to constrain the lines through the control points and the position of the line or curve can be adjusted based on the smoothed line through the control points. The tone curve can then be generated by interpolating the control points (e.g., using a cubic Hermite interpolator)

In an example implementation, the image 5 can be a color corrected image captured at substantially (e.g., by a same shutter event) same moment in time as a video frame (e.g., one of the plurality of frames 20) is captured. In an example implementation, image 5 can be a HDR+ image and video 10 can be a short video (e.g., a micro-video) encoded using the MPEG4 standard sometimes called a MPEG4 micro-video. Accordingly, the image 5 and the video 10 can be stored using the YUV color space. The image 5 and/or the video 10 can be compressed (e.g., encoded) prior to storing (e.g., as a mp4 file). Although the MPEG4 and mp4 standard is referenced, other image and video file standards can be used in example implementations described herein. Although the YUV color space is referenced, other image color spaces (e.g., RGB, Y'UV, YCbCr, YPbPr, and the like) color spaces can be used in example implementations described herein.

Performing color correction 135 (e.g., via computer processing) can include using the color map to perform color and/or tone correction on at least one video frame. For example, color and/or tone correction can be performed on frames of video 10. In an example implementation, the color and/or tone correction can be performed on each of the plurality of frames 20. In another example implementation, the color and/or tone correction can be performed on a selected video frame 130 (e.g., selected from the plurality of frames 20). Performing the color correction 135 can include matching at least one of a pixel, a block of pixels, a range of pixels, and/or a partition of the selected video frame 130 to at least one of a pixel, a block of pixels, a range of pixels, and/or a partition of the color map and then using corresponding values of the color map to perform color and/or tone correction on the video frame (e.g., the selected video frame 130). The video file 140 can be generated to include the color and/or tone corrected plurality of frames 20.

The video file 140 generated in FIG. 1A can be color corrected during the capture phase 105 at the device capturing the video 10 and the image 5. However, computing the color map 125, selecting the video frame 130 and performing color correction 135 can be performed independent of capturing the video 115. In other words, capturing the video 115 can continue while color correction is performed on previously captured frames 20. The (color corrected) video 10 can then be rendered using any rendering technique.

Figure 1B:
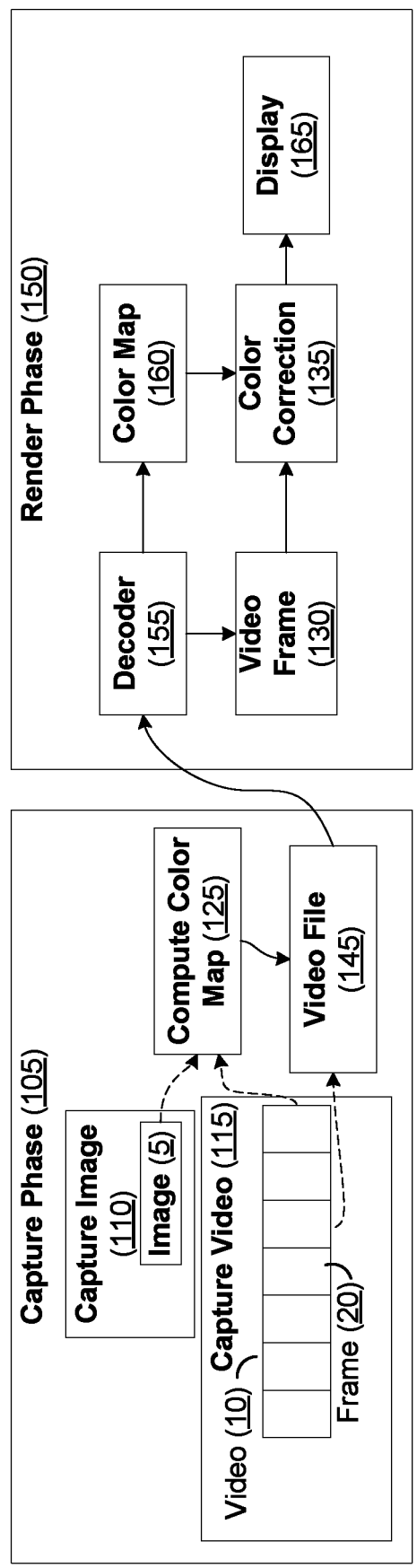
FIG. 1B illustrates a block diagram of a process of generating a video file and rendering a video according to an example implementation.

In some example implementations, color correction can be performed at a rendering device (e.g., a mobile phone, a laptop computer, a desktop computer, and the like). FIG. 1B illustrates a block diagram of generating a video file and rendering a video according to an example implementation. As shown in FIG. 1B, during the capture phase 105, the color map 125 is generated (e.g., via computer processing) based on the corresponding one of the plurality of frames 20 and the image 5. However, in this implementation generating a video file 145 includes using the video 10 and the color map.

The video file 145 can be encoded and communicated (e.g., via a wired or wireless communication channel) to the rendering device configured to implement the rendering phase 150. The rendering phase 150 can include using decoder 155 to decode an encoded video file 145, selecting a color map 160 from the decoded video file, selecting the video frame 130 from the decoded video file, performing color correction 135 and displaying 165 the corrected video. The decoding the video file 145 can be performed by a decoder 155 where the color map 160 and a reconstructed plurality of frames 120 are obtained. Video frame 130 can be selected from the reconstructed plurality of frames 20.

Performing the color correction 135 (e.g., via computer processing) can use the color map 160 to perform color and/or tone correction on a selected video frame 130. The color and/or tone correction can be performed on each of the reconstructed plurality of frames 20. The color correction 135 can include matching a pixel, a block of pixels a range of pixels, or a partition of the selected video frame 130 to a pixel, a block of pixels a range of pixels, or a partition of the color map and then using a corresponding value of the color map to perform color and/or tone correction on the video frame 130. The color and/or tone corrected video frame can be rendered on display 165.

Figure 2:
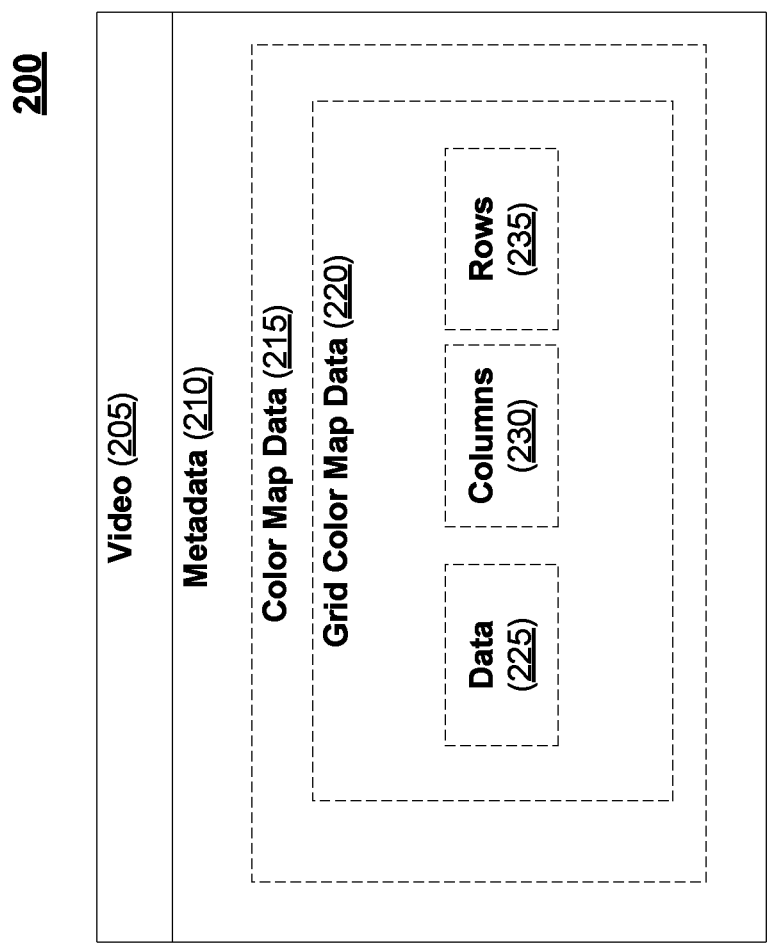
FIG. 2 illustrates a data structure for a video file according to an example implementation.

FIG. 2 illustrates a data structure for a video file (e.g., a generated video file 145) according to an example implementation. As shown in FIG. 2, the data structure 200 includes a video 205. The video 205 includes metadata 210. The metadata 210 includes color map data 215. The color map data 215 can include different types of color maps. For example, the color map data 215 can include a pixel to pixel map(s), a block to block map(s) and or the like. As shown in FIG. 2, the color map data 215 includes grid color map data 220 having data 225, columns 230, and rows 235.

The video 205 can include data associated with a computed color map (e.g., computed color map 125). For example, as discussed above, the color map can be generated based on the corresponding one of the plurality of frames 20 and the image 5. The color map can include the color and tone variance between the corresponding one of the plurality of frames 20 and the image 5.

Metadata 210 can include color map data (e.g., color map 160) as generated using a compute color map process (e.g., by compute color map 125). The columns 230 and rows 235 indicate a number of rows and a number of columns that the color map is partitioned into. For example, the color map can be partitioned into an M×N grid (e.g., 4×4 grid (see FIG. 3 below), a 3×4 grid, a 4×3 grid, and the like). Example implementations are not limited to a grid size. However, too few partitions can limit the effectiveness of the color correction and too many partitions can require a relatively large amount of processing resources and/or memory and may create a time delay in rendering due to processing the error correction.

The data 225 can include a correction parameter(s). The correction parameter(s) can be a value used to correct for tone and/or color. In an example implementation, Y (luminance) can be corrected using gamma correction $Y_{corrected} = Y^\gamma$ and UV (chrominance) can be corrected using a mean value of U, V and a variance value of U, V. For example, the mean value of U, V can be subtracted from the data and the result can be scaled based on the variance of U, V. Accordingly, the correction parameter(s) (e.g., for each partition in the M×N grid) can include a gamma correction value, a mean value of U, V and a variance value of U, V.

In another example implementation, a color correction matrix (CCM) can be used to correct for tone and/or color. In this implementation the dot product of a 3×3 CCM and YUV can generate YUV corrected. Accordingly, the correction parameter(s) (e.g., for each partition in the M×N grid) can include a 3×3 CCM. Other techniques can be used to correct for tone and/or color. In addition, color correction can be performed in other color spaces. For example, the aforementioned 3×3 CCM can be used to perform tone and/or color correction in the RGB color space. In an example implementation, the correction parameter(s) can be generated (e.g., via computer processing) in the compute color map 125 block based on the corresponding one of the plurality of frames 120 and the image 5.

Furthermore, a convolutional neural network (CNN) can be used to correct for tone and/or color. In this implementation, the correction parameter(s) can include a CNN architecture and the weights associated with each neuron of the CNN. In addition, a machine learning (ML) algorithm (e.g., based on the CNN) can be used to train the CNN (e.g., modify the weights) to best correct for tone and/or color. In an example implementation, the correction parameter(s), as weights, can vary the color profile and variance for each partition. Therefore, the CNN can vary the color profile to minimize a variance between the color profile and a pixel (e.g., YUV, RGB and the like) in each partition.

In some implementations, histogram matching and point based transfer can be used in the color and/or tone correcting processes. For example, histogram matching can include modifying the tone and/or color data of the frame to be color corrected until a histogram associated with the frame matches a histogram of the image. In this implementation the histogram can be associated with the matched partition. Point based transfer can include using a scattered point interpolation technique using moving least squares. Scattered point interpolation can include applying a high-order polynomial to the tone and/or color data of the frame in order to interpolate or fit data of the frame to the tone and/or color data of the image. Moving least squares uses a local polynomial such that, in this implementation, the scattered point interpolation can be implemented on the matched partition.

In some implementations, there can be tone and/or color discontinuities on the border between two partitions or blocks in the N×M grid for the tone and/or color corrected frame. Therefore, the color correction process can include a smoothing and/or blending process to remove or minimize the tone and/or color discontinuities. For example, a bilinear interpolation process can be implemented with the color correction 135 block. The bilinear interpolation process can be configured to remove or minimize the tone and/or color discontinuities. Bilinear interpolation can be implemented as a resampling and/or filtering operation. Bilinear interpolation can be implemented based on a tile (or fragment) location within a grid. For example, a tile located at a corner of the grid can be mapped to a closest color. A tile located at a boundary of the grid can be linear interpolated based on 2 colors (e.g., 2 mapped colors). Other tiles can be bi-linear interpolated based on 4 colors (e.g., 4 mapped colors). Other interpolation techniques can be used as well. For example, nearest neighbor, bicubic, higher order, and the like interpolation techniques can be used.

Figure 3:
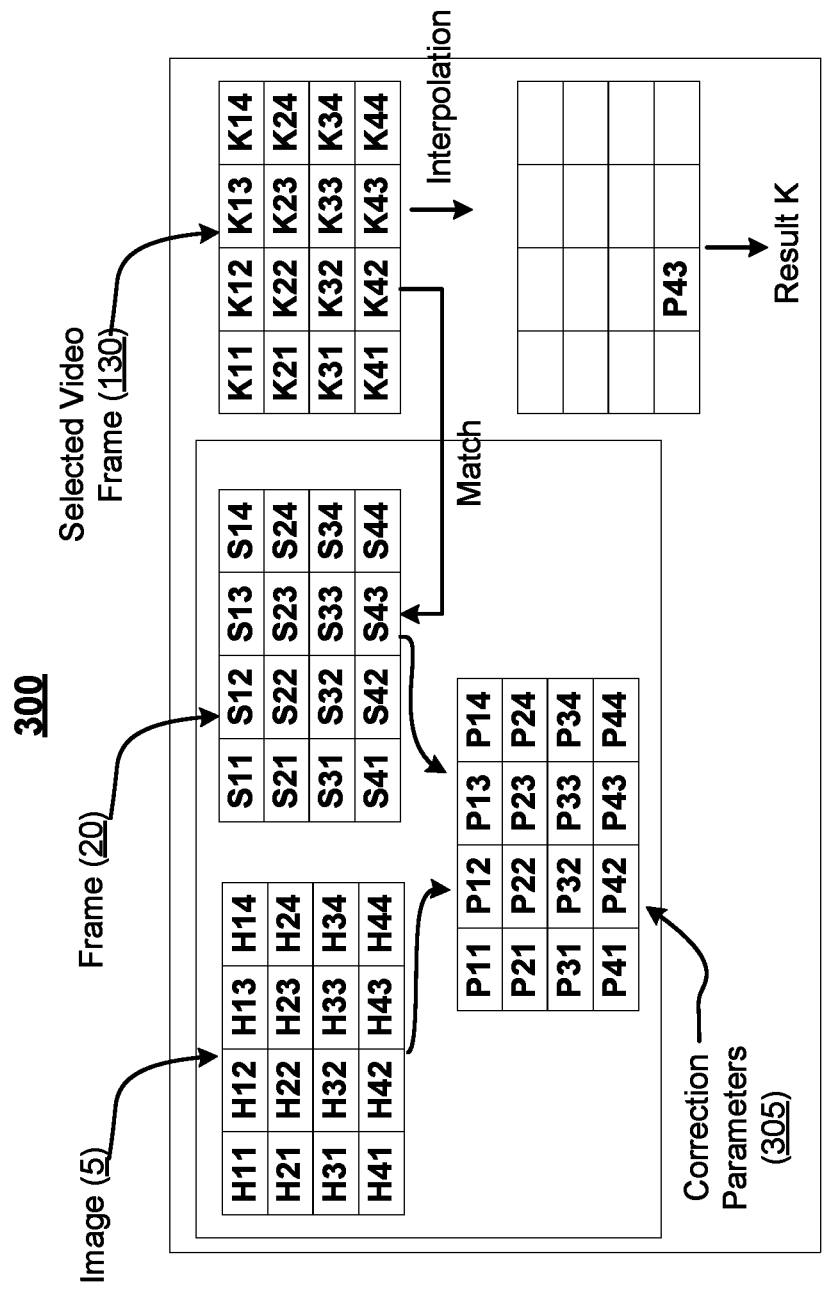
FIG. 3 illustrates a block diagram showing processing of a frame of a video file according to an example implementation.

FIG. 3 illustrates a block diagram showing processing of a frame of a video file according to an example implementation. As shown in FIG. 3, the image 5 and frame 20 are each partitioned into a 4×4 grid including 16 partitions. The partitions can be labeled using the row number and column number. The image 5 is shown as being partitioned into 16 partitions including H11, H12, H13, H14, H21, H22, H23, H24, H31, H32, H33, H34, H41, H42, H43, and H44. The frame 20 is shown as being partitioned into 16 partitions including S11, S12, S13, S14, S21, S22, S23, S24, S31, S32, S33, S34, S41, S42, S43, and S44. Each partition (e.g., H11, S11, . . . , H44, S44) includes at least one pixel. The pixels' values (e.g., YUV, RGB, and the like) of the image 5 and the frame 20 can be used to generate (e.g., calculate) correction parameter(s) 305.

The grid color map data 220 is shown as being partitioned into 16 partitions including P11, P12, P13, P14, P21, P22, P23, P24, P31, P32, P33, P34, P41, P42, P43, and P44. Each partition (e.g., P11, P12, . . . , P44) includes a corresponding correction parameter(s) 305. The video frame 130 is shown as being partitioned into 16 partitions including K11, K12, K13, K14, K21, K22, K23, K24, K31, K32, K33, K34, K41, K42, K43, and K44. Each partition (e.g., K11, K12, . . . , K44) includes at least one pixel. The at least one pixel can be an uncorrected pixel. To process (e.g., color and tone correct) the video frame 130, a partition (e.g., the pixels of the partition) can be matched to (or a match can be found in) a partition in the frame 20. As is shown in FIG. 3, partition K42 of the video frame 130 is matched to partition S43 of the frame 20. Therefore, during color correction, the correction parameter(s) 305 for color correcting partition K42 of the video frame 130 are selected from partition P43 of the grid color map data 220 for the color map.

Figure 4:
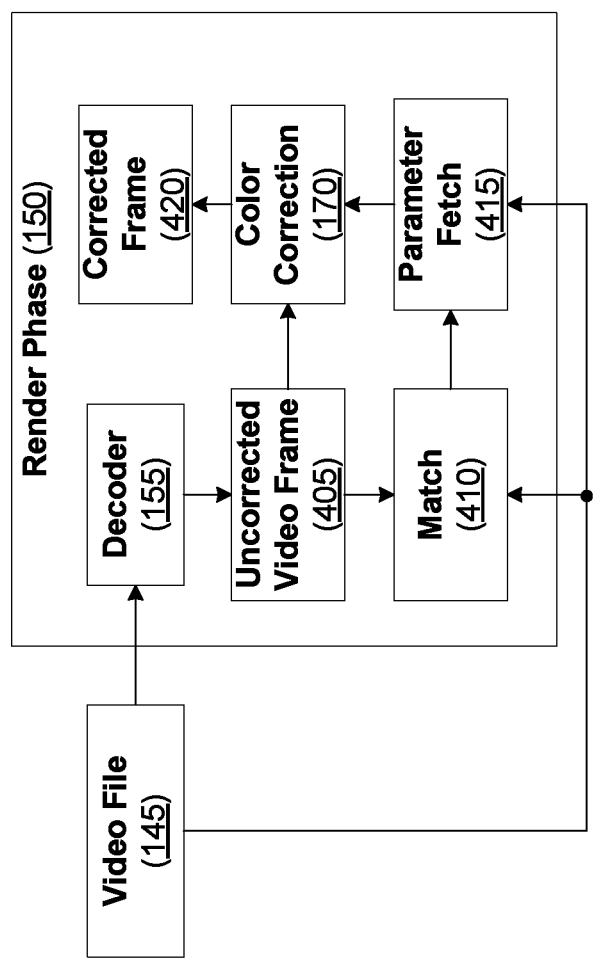
FIG. 4 illustrates a flow diagram for rendering a frame of a video file according to an example implementation.

FIG. 4 illustrates a flow diagram of rendering a frame of a video file according to an example implementation. As shown in FIG. 4, video file 140 (or video file 145) is input to the render phase 150 where the decoder 155 decodes the video file. As discussed above, the video file 145 can include video 205 including data (e.g., metadata 210) that can be used to color correct frames of video. Flow continues to the uncorrected video frame 405 block where a video frame is selected. The selected video frame is a video frame to be color corrected.

Then in the match 410 block the video frame is partitioned into N×M partitions or blocks and each block is matched to a block in the one of the plurality of frames 120 that corresponds to the image 5 (e.g., both captured by a same shutter event). Then, in the parameter fetch 415 block the correction parameters associated with the matched blocks are fetched (e.g., requested and retrieved) from the video 205. For example, at least one parameter is selected from grid color map data 220 using the column 230 and row 235 values of the corresponding matched block. Then the correction 170 block generates the corrected frame using the uncorrected video frame 405 and the at least one parameter as discussed above.

As discussed above, a photo file strip and/or associated with a frame of a short video sometimes called a motion-photo and/or micro-video can be color corrected using one color map (e.g., using any of the techniques described herein). Example embodiments can include color correcting a longer (e.g., a large number of frames) video using a plurality of color maps.

Figure 5:
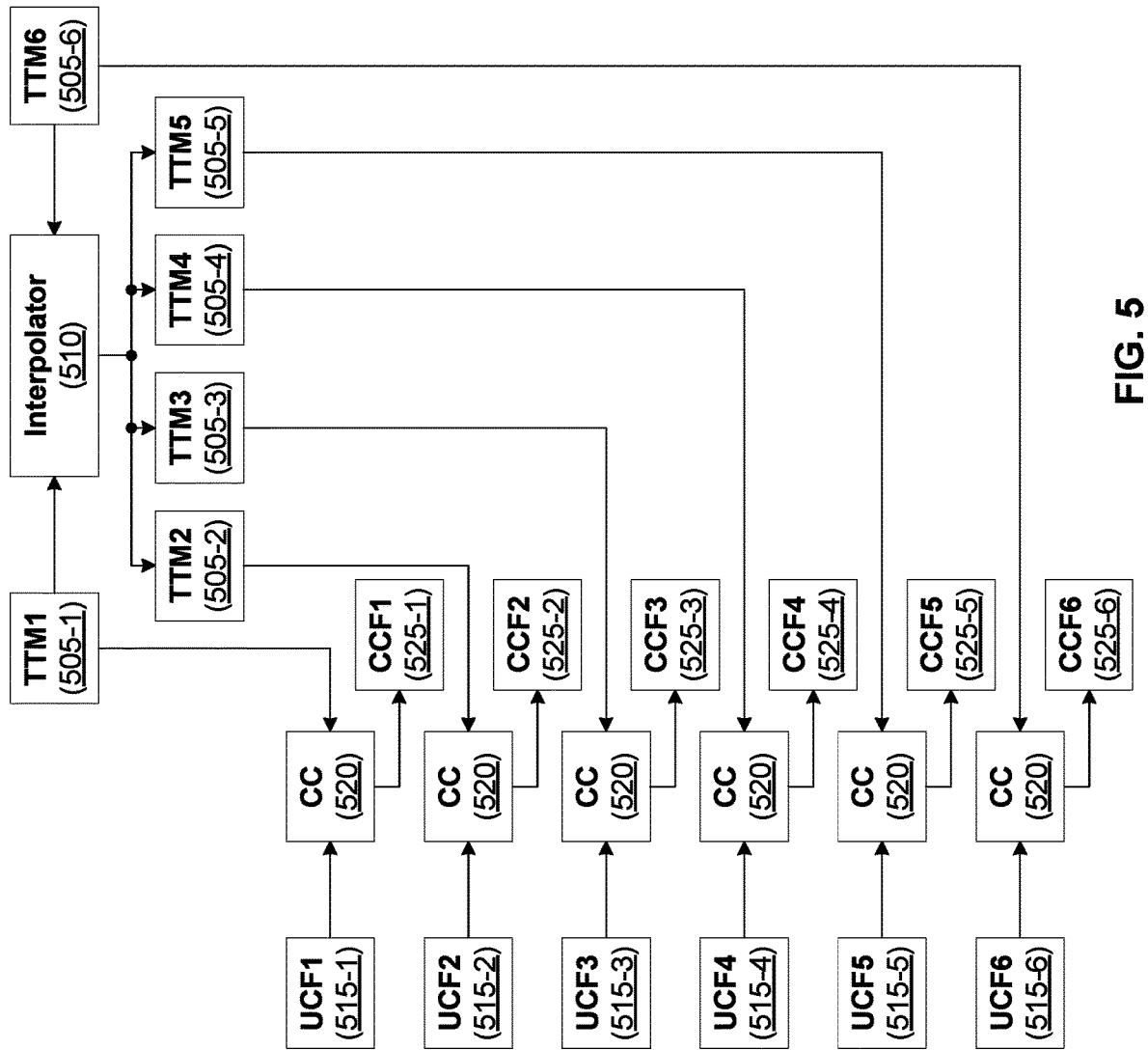
FIG. 5 illustrates a flow diagram for color correcting at least one frame of a video file according to an example implementation.

FIG. 5 illustrates a flow diagram for color correcting at least one frame of a video file according to an example implementation. As shown in FIG. 5, color map data (e.g., TTM1 505-1) is used by a color correction module CC 520 to generate a color corrected frame (e.g., CCF1 525-1) from an uncorrected frame (e.g., UCF1 515-1). In the example of FIG. 5, six (6) frames are color corrected using six (6) color maps. Further, two (2) of the frames are communicated (e.g., from a video capture device, a video streaming device and/or the like) with an associated color map. However, embodiments are not limited thereto.

Color map data can be communicated with uncorrected frame data. The deviation or correction variables can be interpolated from the color map. For example, TTM1 505-1 can be communicated with UCF1 515-1 (e.g., as an encoded file) and TTM6 505-6 can be communicated with UCF6 515-6 (e.g., as an encoded file). TTM2 505-2, TTM3 505-3, TTM4 505-4, and TTM5 505-5 can be generated by an interpolator 510. Accordingly, UCF2 515-2, UCF3 515-3, UCF4 515-4, and UCF5 515-6 may be communicated (e.g., as an encoded file) without an associated color map (note: UCF2 515-2, UCF3 515-3, UCF4 515-4, and UCF5 515-6 can be sequentially positioned after UCF1 515-1 and sequentially positioned before UCF6 515-6 in the corresponding video). Generated TTM2 505-2, TTM3 505-3, TTM4 505-4, and TTM5 505-5 can be used by the color correction module CC 520 to generate color corrected frames CCF2 525-2, CCF3 525-3, CCF4 525-4, and CCF5 525-6 respectively. In an example implementation, UCF1 515-1 (including TTM1 505-1), UCF2 515-2, UCF3 515-3, UCF4 515-4, and UCF5 515-5 may be stored (e.g., a memory que, a memory stack, and/or the like) upon receipt at a rendering device (e.g., including, at least, the interpolator 510 and the CC 520). Upon receipt of UCF6 515-6 (including TTM6 505-6) a rendering of frames process can be triggered including causing TTM2 505-2, TTM3 505-3, TTM4 505-4, and TTM5 505-5 to be generated and causing CCF1 525-1, CCF2 525-2, CCF3 525-3, CCF4 525-4, and CCF5 525-6 to be generated by CC 520 using TTM1 505-1, TTM2 505-2, TTM3 505-3, TTM4 505-4, TTM5 505-5, and TTM6 505-6. Although four (4) frames are shown and described as being received and stored without an associated color map, implementations are not limited thereto.

Interpolator 510 can be configured to generate at least one color map (e.g., TTM2 505-2, TTM3 505-3, TTM4 505-4, and TTM5 505-5) based on at least two color maps each associated with a respective received frame of a video. For example, interpolator 510 can be configured to linear interpolate at least one parameter value based on a corresponding parameter value of at least two color maps. As an example, corresponding parameter values can be calculated as TTM2=0.8*TTM1+0.2*TTM6, TTM3=0.6*TTM1+0.4*TTM6, TTM4=0.4*TTM1+0.6*TTM6, and TTM5=0.2*TTM1+0.8*TTM6. Other interpolation methods can be used. For example, spline interpolation could be used.

FIGS. 6A, 6B, 7 and 8 are flowcharts of methods according to example implementations. The steps described with regard to FIGS. 6A, 6B, 7 and 8 may be performed due to the execution of software code stored in a memory associated with an apparatus (e.g., a computing device configured to capture a video and/or render the video) and executed by at least one processor associated with the apparatus. However, alternative implementations are contemplated such as a system embodied as a special purpose processor like Application-specific integrated circuit (ASIC). Although the steps described below are described as being executed by a processor, the steps are not necessarily executed by a single processor. In other words, at least one processor may execute the steps described below with regard to FIGS. 6A, 6B, 7 and 8.

Figure 6A:
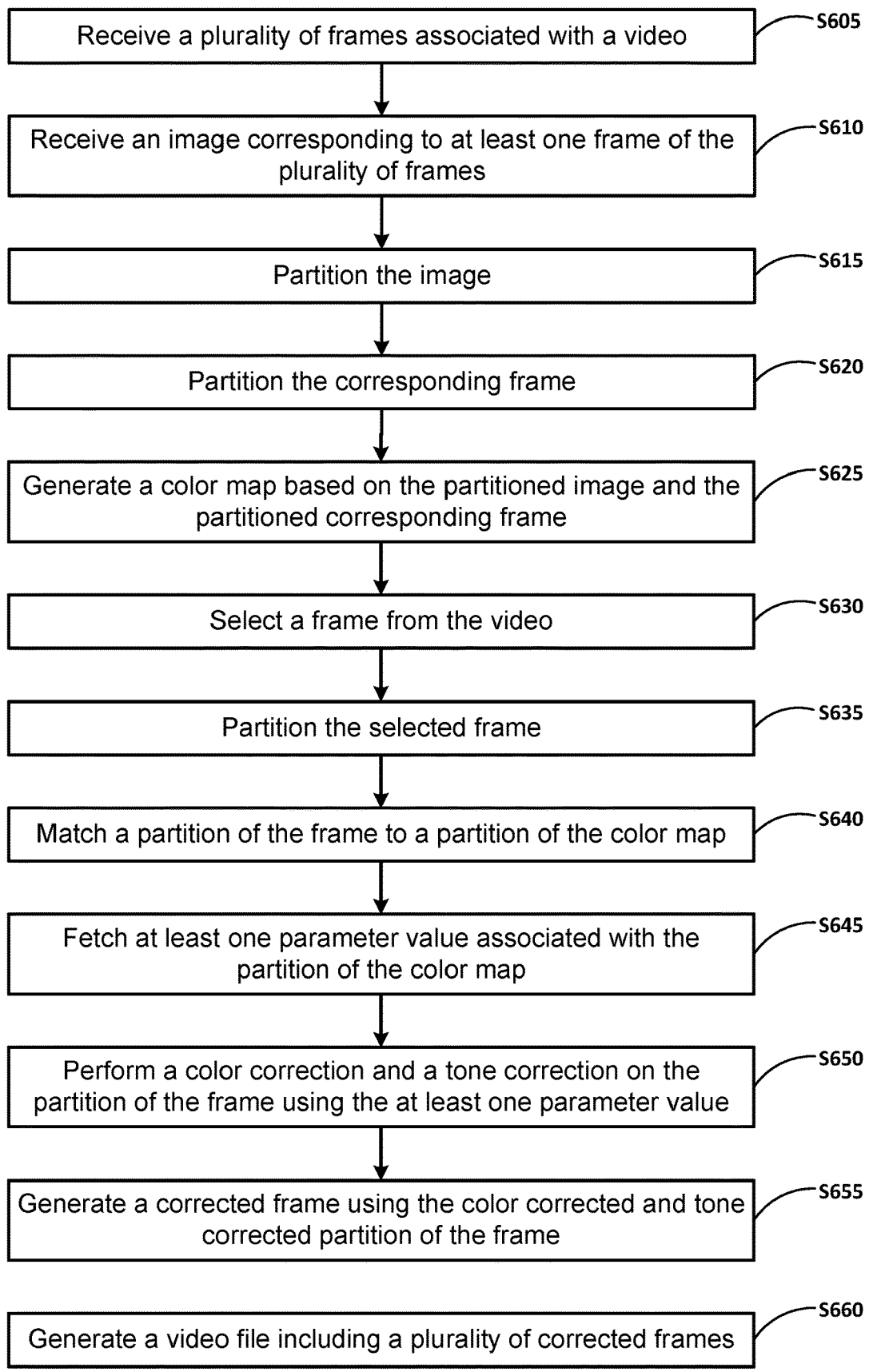
FIG. 6A illustrates a flow diagram for generating a video file according to an example implementation.

FIG. 6A illustrates a flow diagram for generating a video file according to an example implementation. As shown in FIG. 6A, in step S605 a plurality of frames associated with a video are received. For example, a device including a camera (e.g., a digital camera, a digital video device, a mobile phone and the like) is operated by a user to capture the plurality of frames which can be stored together as a video. The stored plurality of frames can be requested and received by a processor of the device. Alternatively, and/or in addition to, the plurality of frames can be stored in a memory external to the device. The stored plurality of frames can be requested and received by a processor of a device configured to display the video and/or some other device including a processor (e.g., a streaming server).

In step S610 an image corresponding to at least one frame of the plurality of frames is received. For example, the image can be captured by the camera and stored in a memory of the camera. In an example implementation, the image 5 can be captured at substantially (e.g., by a same shutter event) same moment in time as one of the plurality of frames 120. The stored image can be requested and received by a processor of the device. Alternatively, and/or in addition to, the image can be stored in a memory external to the device. The stored image can be requested and received by a processor of a device configured to display the image and/or video and/or some other device including a processor (e.g., a streaming server).

In step S615 the image is partitioned. For example, the image can be partitioned into N×M grid of partitions or blocks. As discussed above, image 5 can be partitioned into a 4×4 grid of 16 partitions.

In step S620 the corresponding frame is partitioned. For example, the frame can be partitioned into N×M grid of partitions or blocks. As discussed above, the frame (of the plurality of frames 120) captured at substantially (e.g., by a same shutter event) same moment in time as the image 5 can be partitioned into a 4×4 grid of 16 partitions.

In step S625 a color map is generated based on the partitioned image and the partitioned corresponding frame. For example, the color map can be generated based on the corresponding one of the plurality of frames 120 and the image 5. The color map can include the color and tone variance between the corresponding one of the plurality of frames 120 and the image 5. For example, the corresponding one of the plurality of frames 120 can be stored using the YUV color space and the image 5 can be stored using the YUV color space. Accordingly, the color map can include the difference between a Y (luminance) and UV (chrominance) of the corresponding one of the plurality of frames 120 and the image 5. The color map can include a pixel-by-pixel variance, a value associated with a block of pixels, a value associated with a partition of the corresponding one of the plurality of frames 120 and/or the image 5 and the like. The plurality of frames 120 and/or the image 5 can be stored using a color space other than the YUV color space. For example, the plurality of frames 120 and/or the image 5 can be stored using the RGB, Y'UV, YCbCr, YPbPr, and the like color spaces.

In step S630 a frame from the video is selected. For example, each of the plurality of frames associated with the video can be targeted for color correction. Therefore, the selected frame can be one of the plurality of frames. In an example implementation, each of the plurality of frames is selected sequentially (or in some other order) for color correction. Then, in step S635 the selected frame is partitioned. For example, the selected frame can be partitioned into N×M grid of partitions or blocks.

In step S640 a partition of the frame is matched to a partition of the color map. For example, in order to process (e.g., color and tone correct) the selected video frame (e.g., video frame 130), a partition (e.g., the pixels of the partition) can be matched to (or a match can be found in) a partition in frame (of the plurality of frames 120) captured at substantially (e.g., by a same shutter event) same moment in time as the image. As is shown above in FIG. 3, partition K42 of the video frame 130 is matched to partition S43 of the frame 20. Then, in step S645 at least one parameter value associated with the partition of the color map is fetched. Continuing the example, during color correction, the correction parameter(s) 305 for color correcting partition K42 of the video frame 130 are selected from partition P43 of the grid color map data 220 for the color map.

In step S650 a color correction and a tone correction is performed on the partition of the frame using the at least one parameter value. For example, the at least one parameter value can be used to perform color and/or tone correction on the selected frame. In an example implementation, Y (luminance) can be corrected using gamma correction $Y_{corrected} = Y^\gamma$ and UV (chrominance) can be corrected using a mean value of U, V and a variance value of U, V. For example, the mean value of U, V can be subtracted from the data and the result can be scaled based on the variance of U, V. Accordingly, the at least one parameter value can include a gamma correction value, a mean value of U, V and a variance value of U, V.

As discussed above, in one or more other example implementation, a color correction matrix (CCM) technique, a trained convolutional neural network (CNN) technique, a histogram matching technique and/or a point based transfer technique can be used to correct for tone and/or color. In addition, as discussed above, color correction process include a smoothing and/or blending process to remove or minimize the tone and/or color discontinuities along a border between two partitions in a grid. Although the YUV color space is referenced, other image color spaces (e.g., RGB, Y'UV, YCbCr, YPbPr, and the like) color spaces can be used in example implementations described herein.

In step S655 a corrected frame is generated using the color corrected and tone corrected partition of the frame. For example, steps S640 to S650 can be repeated for each partition to color correct all of the frame partitions. Accordingly, the frame is color corrected.

In step S660 a video file including a plurality of corrected frames is generated. For example, steps S630 to S655 can be repeated for each of the plurality of frames. Then, the video file (e.g., video file 140) can be generated using the plurality of color corrected frames.

Figure 6B:
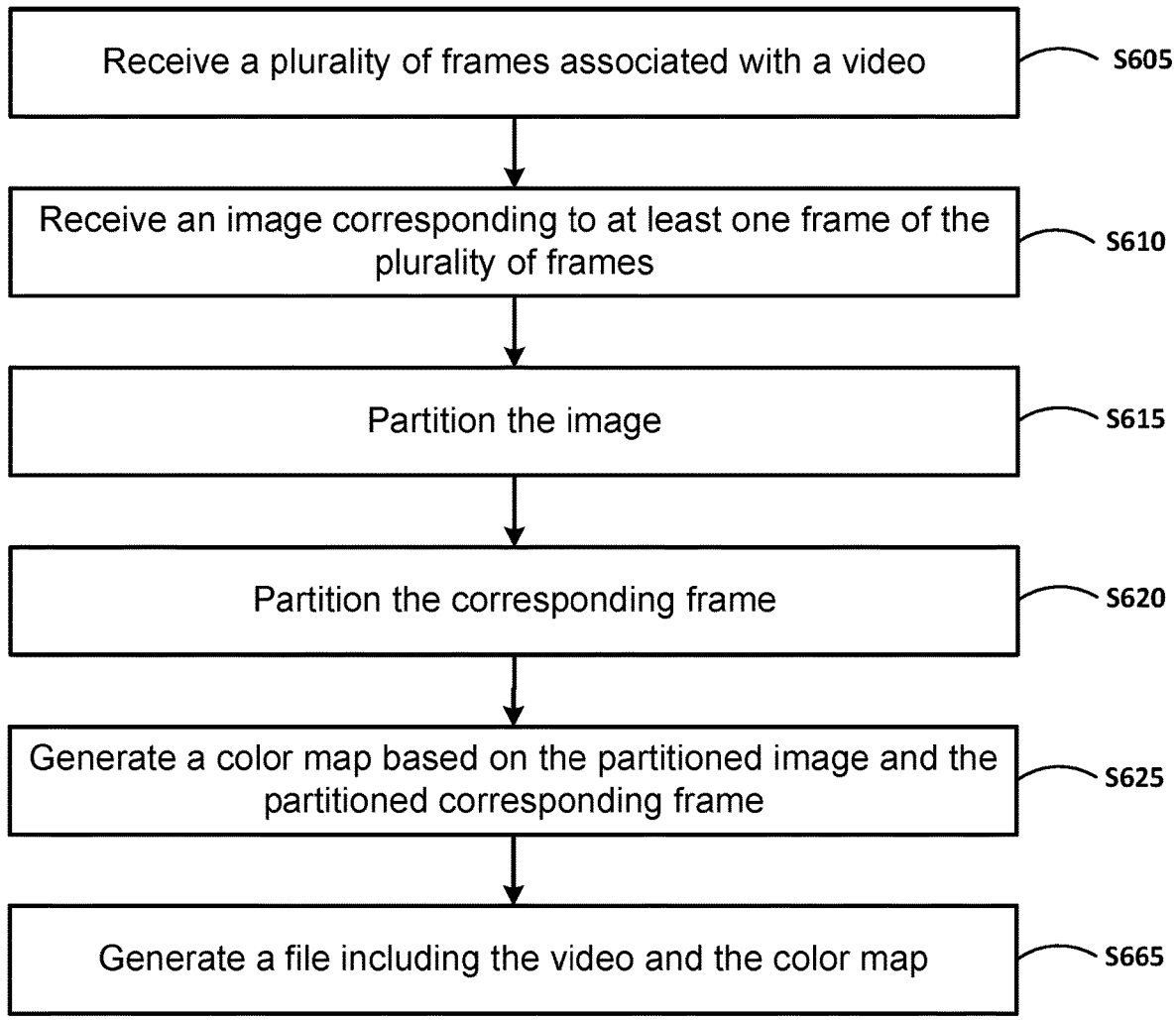
FIG. 6B illustrates another flow diagram for generating a video file according to an example implementation.

In an example implementation, the color correction can be performed on a rendering device (e.g., a device that is not the capture device). In this implementation, the capture device can perform steps S605 to S625 and not steps S630 to S660. FIG. 6B illustrates another flow diagram for generating a video file according to an example implementation. As shown in FIG. 6B, in step S665 a file including the video and the color map is generated. For example, the color map can be included in a data structure corresponding to the video 205 as described above. The color map can be inserted and stored, for example, in a header associated with the video. The video 205 and/or the metadata 210 can be compressed prior to storing the color map as metadata in the header.

Figure 7:
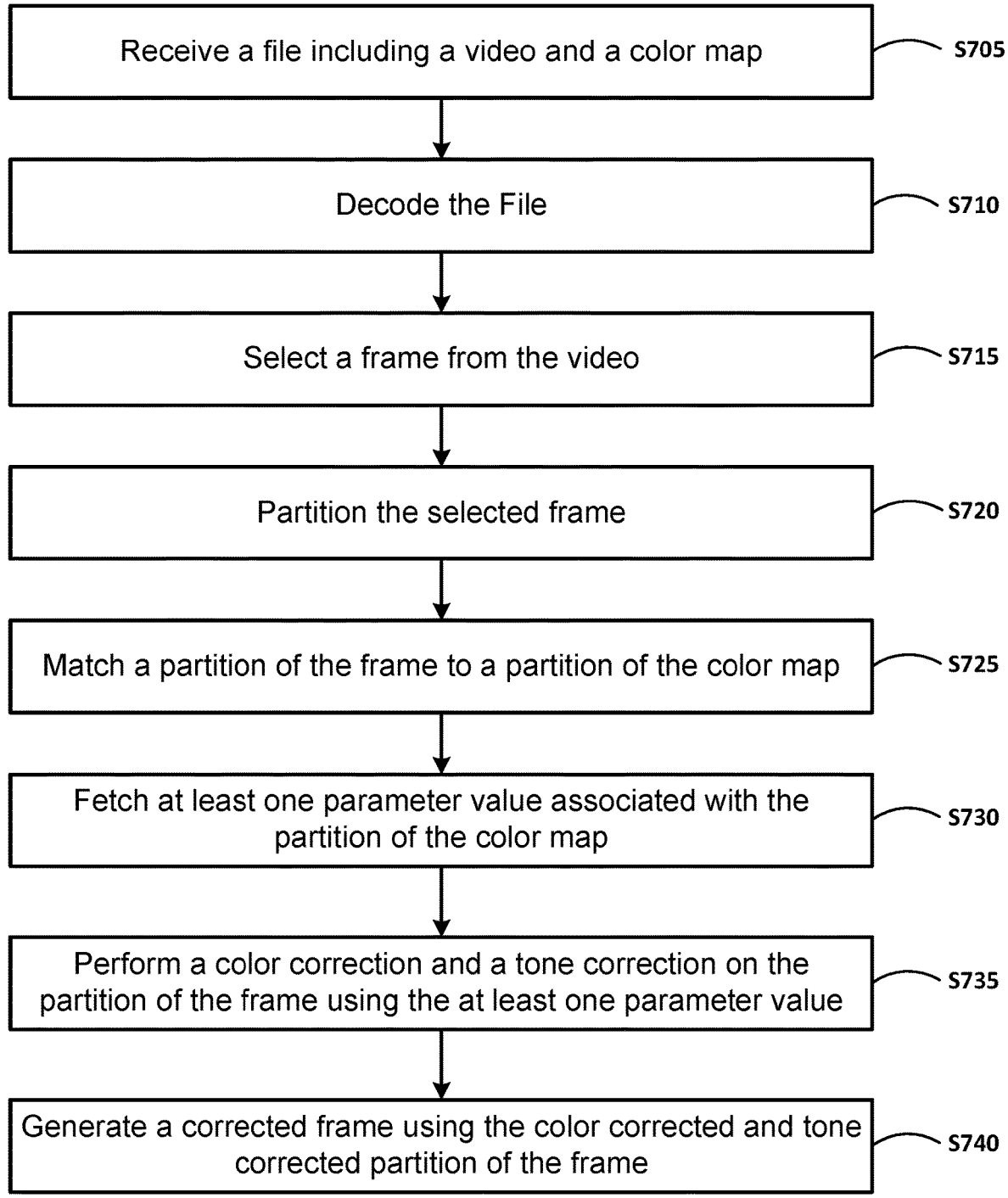
FIG. 7 illustrates a flow diagram for generating a color and tone corrected frame of a video according to an example implementation.

FIG. 7 illustrates a flow diagram for generating a color and tone corrected frame of a video according to an example implementation. As shown in FIG. 7, in step S705 a file including a video and a color map is received. For example, the file can be on a memory device (e.g., memory stick, CD-ROM, or the like) and/or downloaded from a cloud device. For example, the color map can be included in a data structure including the metadata 210 as described above. The image data can be stored, for example, as metadata in a header associated with the video.

In step S710 the file is decoded. For example, the video file 140 and/or the video file 145 can be compressed prior to storing the video 205 including metadata 210 in the header. Therefore, the file can be decoded/decompressed using a same standard that the video file 140 and/or the video file 145 was compressed using.

In step S715 a frame from the video is selected. For example, each of the plurality of frames associated with the video can be targeted for color correction. Therefore, the selected frame can be one of the plurality of frames. In an example implementation, each of the plurality of frames is selected sequentially (or in some other order) for color correction. Then, in step S720 the selected frame is partitioned. For example, the selected frame can be partitioned into N×M grid of partitions or blocks.

In step S725 a partition of the frame is matched to a partition of the color map. For example, in order to process (e.g., color and tone correct) the selected video frame (e.g., video frame 130), a partition (e.g., the pixels of the partition) can be matched to (or a match can be found in) a partition in frame (of the plurality of frames 120) captured at substantially (e.g., by a same shutter event) same moment in time as the image. As is shown above in FIG. 3, partition K42 of the video frame 130 is matched to partition S43 of the frame 20. Then, in step S730 at least one parameter value associated with the partition of the color map is fetched. Continuing the example, during color correction, the correction parameter(s) 305 for color correcting partition K42 of the video frame 130 are selected from partition P43 of the grid color map data 220 for the color map.

In step S735 a color correction and a tone correction is performed on the partition of the frame using the at least one parameter value. For example, the at least one parameter value can be used to perform color and/or tone correction on the selected frame. For example, the at least one parameter value can be used to perform color and/or tone correction on the selected frame. In an example implementation, Y (luminance) can be corrected using gamma correction $Y_{corrected}=Y^\gamma$ and UV (chrominance) can be corrected using a mean value of U, V and a variance value of U, V. For example, the mean value of U, V can be subtracted from the data and the result can be scaled based on the variance of U, V. Accordingly, the at least one parameter value can include a gamma correction value, a mean value of U, V and a variance value of U, V.

As discussed above, in one or more other example implementation, a color correction matrix (CCM) technique, a trained convolutional neural network (CNN) technique, a histogram matching technique and/or a point based transfer technique can be used to correct for tone and/or color. In addition, as discussed above, color correction process include a smoothing and/or blending process to remove or minimize the tone and/or color discontinuities along a border between two partitions in a grid. Although the YUV color space is referenced, other image color spaces (e.g., RGB, Y'UV, YCbCr, YPbPr, and the like) color spaces can be used in example implementations described herein.

In step S740 a corrected frame is generated using the color corrected and tone corrected partition of the frame. For example, steps S640 to S650 can be repeated for each partition to color correct all of the frame partitions. Accordingly, the frame is color corrected.

Figure 8:
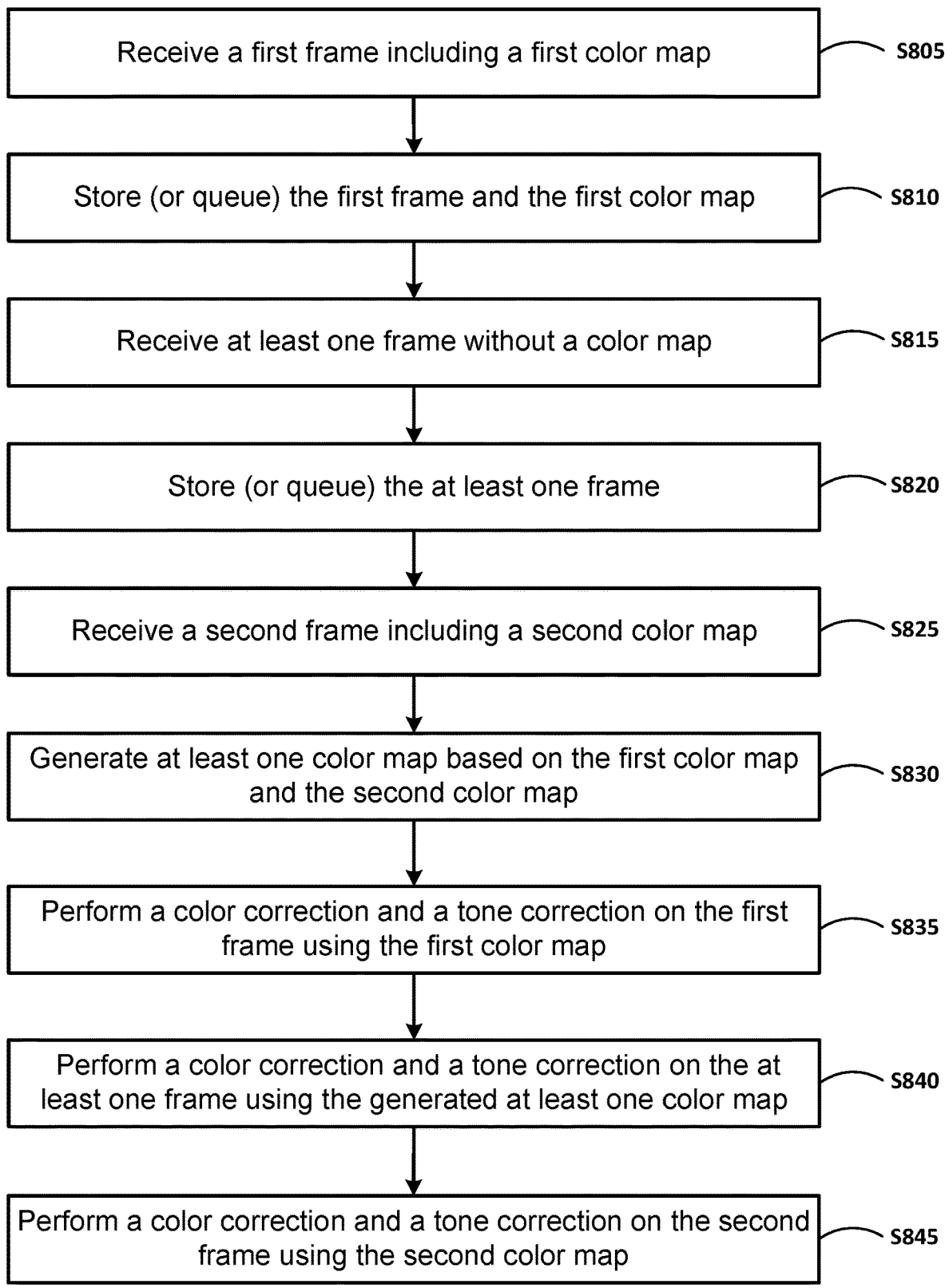
FIG. 8 illustrates a flow diagram for color correcting at least one frame of a video file according to an example implementation.

FIG. 8 illustrates a flow diagram for color correcting at least one frame of a video file according to an example implementation. As shown in FIG. 8, in step S805 a first frame including a first color map is received. For example, a file including frames of a video can be on a memory device (e.g., memory stick, CD-ROM, and/or the like) and/or downloaded (e.g., streamed, moved, copied, and/or the like) from a cloud device. The file can be copied and/or communicated as one or more frames (e.g., as individual frames and/or as a plurality of frames). The first frame includes, at least, the first color map (e.g., TTM1 505-1) and image data (e.g., UCF1 515-1). The color map can be included in a data structure including the metadata 210 as described above. The image data can be stored, for example, as metadata in a header associated with the video.

In step S810 the first frame and the first color map are stored (or queued). For example, the file including the first frame and the first color map can be received at a device (e.g., a computing device) configured to perform a render phase (e.g., render phase 150) as described above. The device can include memory (e.g., a volatile memory, a non-volatile memory, non-transitory computer readable medium, and/or the like). The memory can be configured as a queue or a stack. Accordingly, the first frame and the first color map can be stored in the queue or the stack.

In step S815 at least one frame without a color map is received. As discussed above, the file can be copied and/or communicated as one or more frames (e.g., as individual frames and/or as a plurality of frames). The at least one frame without a color map includes, at least, image data (e.g., UCF2 515-2). The image data can be stored, for example, as metadata in a header associated with the video.

In step S820 the at least one frame is stored (or queued). For example, the file including the at least one frame can be received at the same device configured to perform a render phase as the first frame as described above. At least one frame can be stored in the queue or the stack.

In step S825 a second frame including a second color map is received. As discussed above, the file can be copied and/or communicated as one or more frames (e.g., as individual frames and/or as a plurality of frames). The second frame includes, at least, the second color map (e.g., TTM6 505-6) and image data (e.g., UCF6 515-6). The color map can be included in a data structure including the metadata 210 as described above. The image data can be stored, for example, as metadata in a header associated with the video.

The file (e.g., video file 140 and/or the video file 145) can be compressed prior to storing the image data (e.g., video 205) with or without the color map (e.g., metadata 210). Therefore, the file can be decoded/decompressed using the same standard that the file (e.g., video file 140 and/or the video file 145) was compressed using. The decoding/decompressing can be performed before or after the storing steps described above. Further, in order to ensure that sequential frames are color corrected in order, the sequential frames can be encoded in a sequential batch. In other words, in-between frames can be queued until a beginning color map (e.g., TTM1 505-1) and end color map (e.g., TTM6 505-6) are received for encoding. Then the queued frames, including the frames having a color map, can be sent to an encoder as a batch of files.

In step S830 at least one color map based on the first color map and the second color map is generated. For example, receipt of the second color map can trigger the generation of the at least one color map based on the first color map and the second color map. As described above generating the at least one color map (e.g., TTM2 505-2) can include performing a linear interpolation of at least one parameter value based on a corresponding parameter value of the first color map (e.g., TTM1 505-1) and the second color map (e.g., TTM6 505-6).

In step S835 a color correction and a tone correction on the first frame using the first color map is performed. For example, color correction and a tone correction can be performed using the techniques described herein as discussed above with regards to, at least, FIGS. 4, 7 and 8.

In step S840 a color correction and a tone correction on the at least one frame using the generated at least one color map is performed. For example, color correction and a tone correction can be performed using the techniques described herein as discussed above with regards to, at least, FIGS. 4, 7 and 8.

In step S845 a color correction and a tone correction on the second frame using the second color map is performed. For example, color correction and a tone correction can be performed using the techniques described herein as discussed above with regards to, at least, FIGS. 4, 7 and 8.

In addition, the received color maps TTM1 505-1 and TTM6 505-6 as well as the generated color maps TTM2 505-2, TTM3 505-3, TTM4 505-4, and TTM5 505-5 can be (or replace) color map 160 in a render phase 150 for a lengthy video. Accordingly, parameter fetch 415 block can include retrieving at least one parameter from the color maps TTM1 505-1, TTM2 505-2, TTM3 505-3, TTM4 505-4, TTM5 505-5, and TTM6 505-6 for use in color correction block 170.

Figure 9:
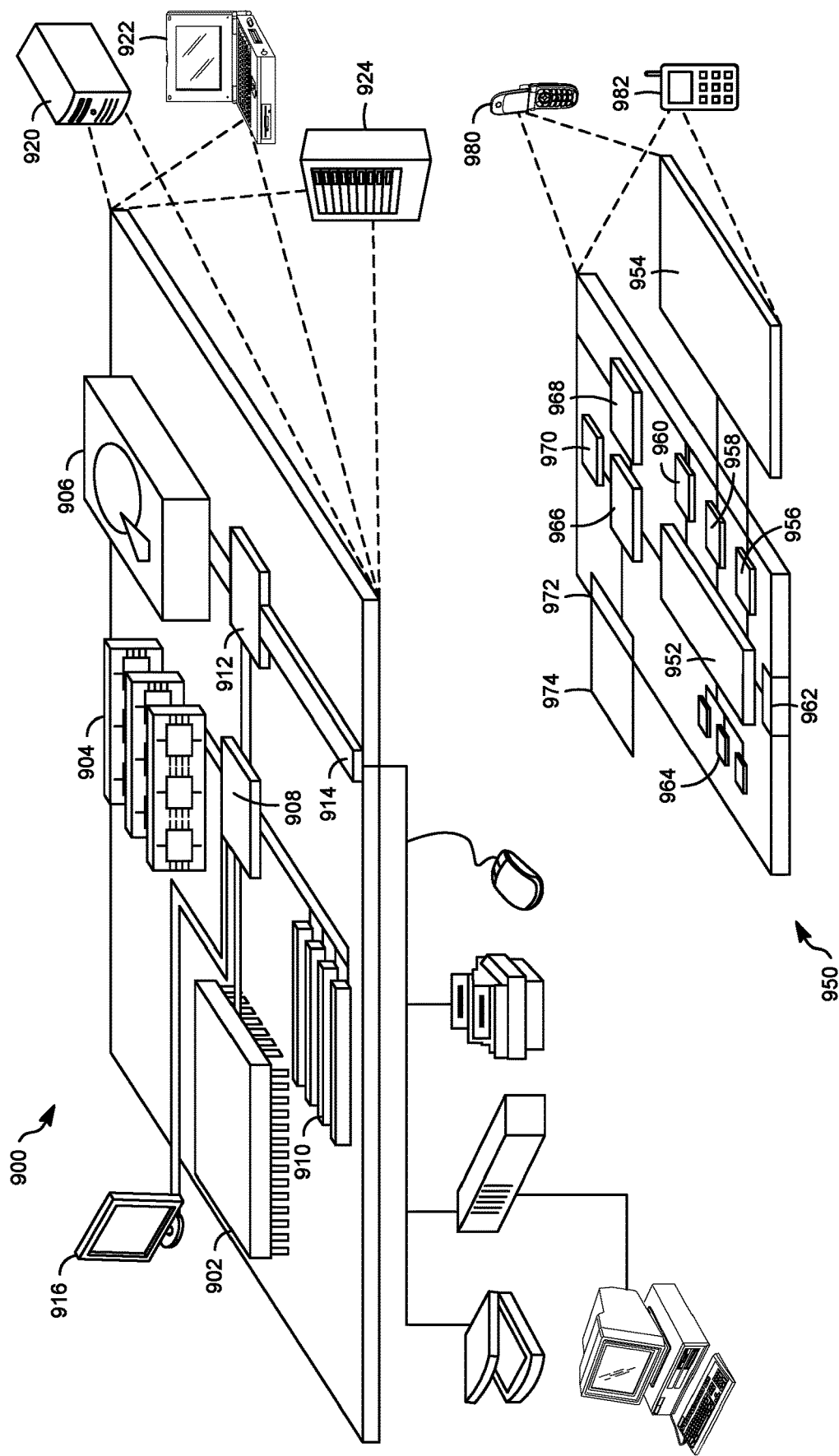
FIG. 9 shows an example of a computer device and a mobile computer device according to at least one example implementation.

FIG. 9 shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDM72000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
receiving a plurality of frames associated with a video file;
receiving a first image corresponding to a first frame of the plurality of frames;
receiving a second image corresponding to a second frame of the plurality of frames;
generating a first color map based on the first image and the first frame, wherein the first color map is based on a color and a tone of the first image and a color and tone of the first frame;
generating a second color map based on the second image and the second frame, wherein the second color map is based on a color and a tone of the second image and a color and tone of the second frame;
generating a plurality of third color maps based on the first color map and the second color map;
associating each of the plurality of third color maps with a different one of the plurality of frames, the associated plurality of frames being sequentially positioned between the first frame and the second frame;
tone correcting the associated plurality of frames based on the plurality of generated third color maps; and
color correcting the associated plurality of frames based on the plurality of generated third color maps.

2. The method of claim 1, further comprising:
performing a post-capture process on the first image; and
performing the post-capture process on the second image, wherein the post-capture process includes at least one of noise reduction, stabilization, exposure balancing, white balancing, color noise reduction, color correction, tone scaling, or gamma correction.

3. The method of claim 1, wherein:
the first color map includes at least one first correctable quality parameter difference between the first image and the corresponding frame, and
the second color map includes at least one second correctable quality parameter difference between the second image and the corresponding frame.

4. The method of claim 1, wherein
tone correcting the associated plurality of frames includes matching at least one of a pixel, a block of pixels, a range of pixels, or a partition of the associated plurality of frames to at least one of a pixel, a block of pixels, a range of pixels, or a partition of the third color maps and using a value of the third color maps to perform the tone correcting of the associated plurality of frames, and
color correcting the associated plurality of frames includes matching at least one of the pixel, the block of pixels, the range of pixels, or the partition of the associated plurality of frames to at least one of the pixel, the block of pixels, the range of pixels, or the partition of the third color maps and using the value of the third color maps to perform the color correcting of the associated plurality of frames.

5. The method of claim 1, wherein:
the plurality of generated third color maps are partitioned into an M×N grid having M columns and N rows,
each partition includes data indicating a correction parameter, and
the correction parameter includes a value for gamma correction.

6. The method of claim 1, wherein generating the plurality of third color maps includes performing a linear interpolation of at least one parameter value based on a corresponding parameter value of the first color map and the second color map.

7. The method of claim 1, wherein:
the first color map is generated using an overlapping tone mapping grid, and
the second color map is generated using the overlapping tone mapping grid.

8. The method of claim 1, further comprising:
partitioning the first image; and
partitioning the corresponding frame into a partitioned frame,
wherein generating the first color map includes:
determining a color variance between each partition of the first image and a corresponding partition of the partitioned frame,
determining a tone variance between each partition of the first image and a corresponding partition of the partitioned frame, and
wherein at least one of the determined color variance and the determined tone variance is based on a luminance difference or a chrominance difference.

9. A method comprising:
receiving a plurality of frames associated with a video;
identifying a first image corresponding to a first frame of the plurality of frames;
identifying a second image corresponding to a second frame of the plurality of frames;
generating a first color map based on a color and a tone of the image and a color and tone of the frame to which the first image corresponds;
generating a second color map based on a color and a tone of the image and a color and tone of the frame to which the second image corresponds;
generating a plurality of third color maps based on the first color map and the second color map;
generating a first data structure including data representing the first color map;
generating a second data structure including data representing the second color map;
generating a plurality of third data structures based on the plurality of third color maps;
storing the first data structure as metadata in a first header associated with the video;
storing the second data structure as metadata in a second header associated with the video;
storing the plurality of third data structures as metadata in a third header associated with the video;
storing at least one frame of the plurality of frames, the at least one frame being sequentially positioned between the first frame and the second frame; and
batch encoding the first frame, the second frame, the at least one frame, the first data structure, the second data structure, and the plurality of third data structures.

10. The method of claim 9, further comprising:
performing a post-capture process on the first image; and
performing the post-capture process on the second image, wherein the post-capture process includes at least one of noise reduction, stabilization, exposure balancing, white balancing, color noise reduction, color correction, tone scaling, and gamma correction.

11. The method of claim 9, wherein:
the first color map includes at least one first correctable quality parameter difference between the first image and the corresponding frame, and the second color map includes at least one second correctable quality parameter difference between the second image and the corresponding frame.

12. The method of claim 9, wherein
the generated at least one second color map is partitioned into an M×N grid having M columns and N rows,
each partition includes data indicating a correction parameter, and
the correction parameter includes a value for gamma correction.

13. The method of claim 9, wherein:
the first color map is generated using an overlapping tone mapping grid, and
the second color map is generated using the overlapping tone mapping grid.

14. A method comprising:
receiving a first video file including a first frame of a plurality of frames, the first video file including a first header including a first data structure including data representing a first color map;
receiving at least one second video file representing at least one second frame of the plurality of frames;
receiving a third video file representing a third frame of the plurality of frames, the third video file including a second header including a second data structure including data representing a second color map;
generating at least one third color map based on the first color map and the second color map;
associating the at least one third color map with the at least one second frame, the associated at least one second frame being sequentially positioned between the first frame and the third frame;
tone correcting the associated at least one second frame based on the at least one generated third color map; and
color correcting the at least one second frame based on the at least one generated third color map.

15. The method of claim 14, wherein
the tone correcting of the at least one second frame includes matching at least one of a pixel, a block of pixels, a range of pixels, or a partition of the at least one second frame to at least one of a pixel, a block of pixels, a range of pixels, or a partition of the corresponding at least one third color map and using a value of the corresponding at least one third color map to perform the tone correcting of the at least one second frame, and
the color correcting of the at least one second frame includes matching at least one of the pixel, the block of pixels, the range of pixels, or the partition of the at least one second frame to at least one of the pixel, the block of pixels, the range of pixels, or the partition of the corresponding at least one third color map and using the value of the corresponding at least one third color map to perform the color correcting of the at least one second frame.

16. The method of claim 14, wherein
the generated at least one third color map is partitioned into an M×N grid having M columns and N rows,
each partition includes data indicating a correction parameter, and
the correction parameter includes a value for gamma correction.

17. The method of claim 14, wherein color correcting of the at least one second frame includes performing a smoothing process to minimize color discontinuities.

18. The method of claim 14, wherein color correcting of the at least one second frame includes performing a blending process to minimize color discontinuities.

19. The method of claim 14, wherein color correcting of the at least one second frame includes using a trained convolutional neural network to minimize color variance between a partition of the at least one second frame and a partition of the corresponding at least one third color map.

20. The method of claim 14, wherein color correcting of the at least one second frame includes a performing a chrominance correction process using a mean value of a color space variable and a variance value of the color space variable.

* * * * *